INVENTOR
Fulton W. Hallowell, Jr.

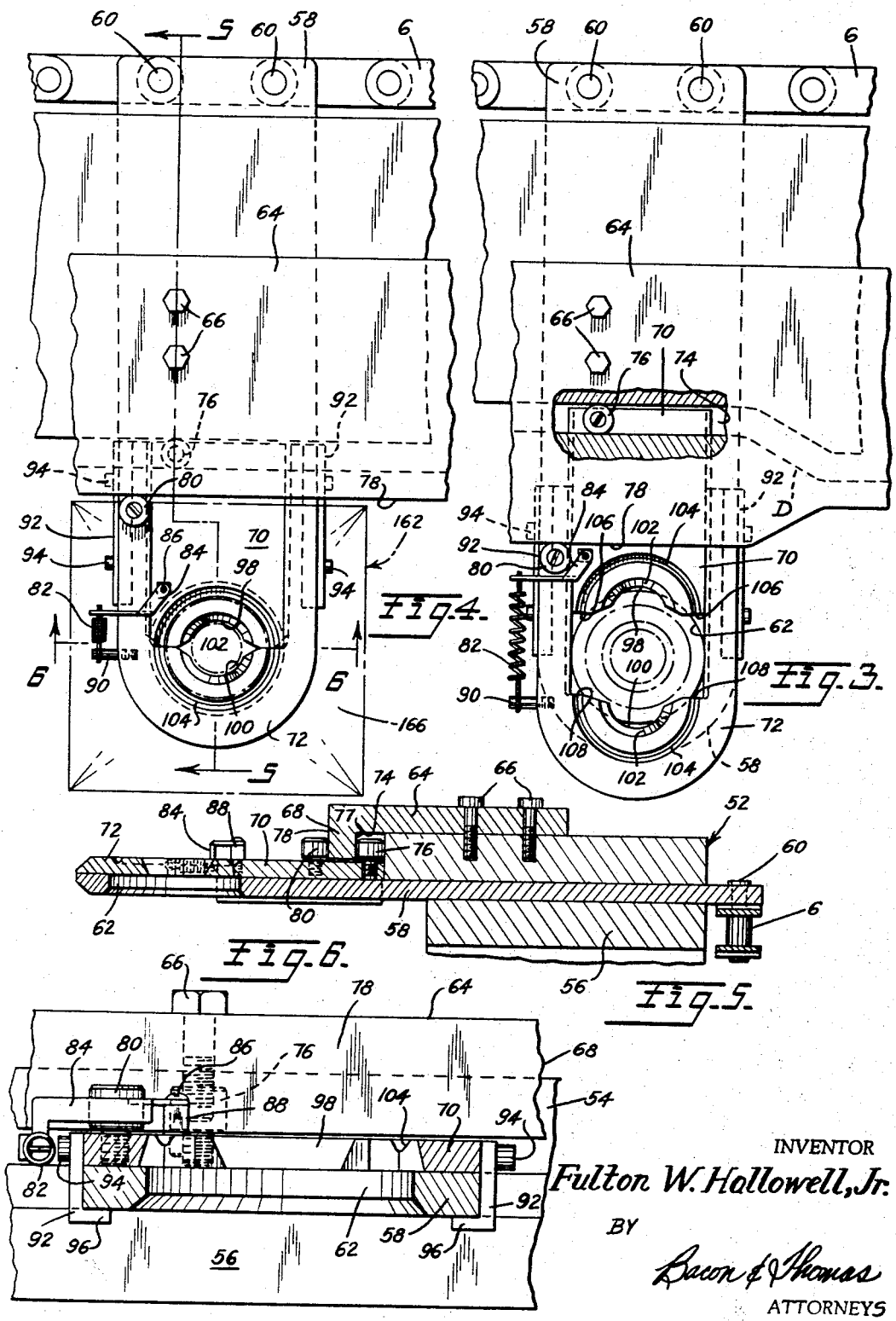

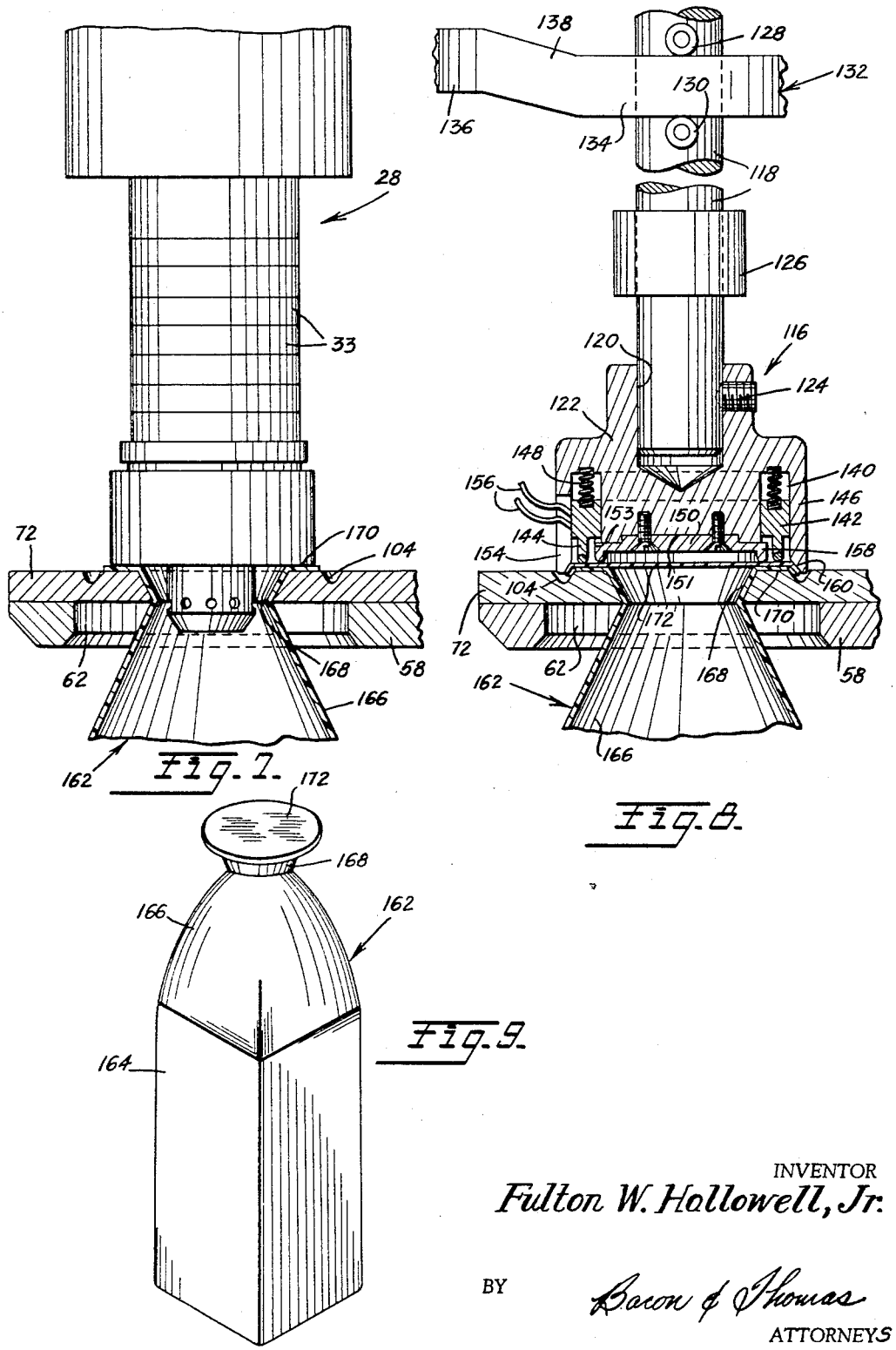

United States Patent Office 3,405,826
Patented Oct. 15, 1968

3,405,826
THERMOPLASTIC BOTTLE
Fulton W. Hallowell, Jr., Levittown, Pa., assignor to R. E. Hartung Company, Inc., a corporation of New Jersey
Original application May 29, 1963, Ser. No. 284,261, now Patent No. 3,309,836, dated Mar. 21, 1967. Divided and this application Jan. 20, 1967, Ser. No. 636,556
6 Claims. (Cl. 215—1)

ABSTRACT OF THE DISCLOSURE

A thermoplastic bottle distinguished by an upwardly and outwardly extending upper neck portion and a laterally outwardly extending annular flange at its upper end useful for supporting the bottle while filling and closing it.

This application is a division of my copending application Ser. No. 284,261, filed May 29, 1963, now United States Patent No. 3,309,836, issued on Mar. 21, 1967, for Method and Apparatus for Filling and Heating-Sealing Plastic Containers.

This invention relates to a method and apparatus for filling a particular type of thermoplastic container with a liquid and for capping the containers with a removably attached, heat-sealable closure.

The thermoplastic bottles and containers presently being employed for merchandising a great variety of liquid materials are heavy and rigid and are normally formed by molding. When bottles of this type are filled and capped by conventional equipment, they are conveyed therethrough by means of underlying rollers and/or conveyor belts. At the filling and closing stations, they are subjected to a downward pressure by the filling and capping heads applied thereto. The bottles must necessarily be formed of a heavyweight thermoplastic material so that they will withstand this pressures without deformation or distortion of the walls of the container. This pressure would otherwise result in canting the lip or mouth of the bottles out of proper contact with the heads, thus permitting the escape of some of the liquid during filling, and in improper closing. It is, however, desirable to employ thermoplastic bottles which are as light in weight and gauge as possible for reducing the amount of material used in making the bottles, thus greatly reducing the cost of manufacture, and also for reducing the cost of handling and shipping.

It is one of the objects of the invention to provide thermoplastic bottles and containers of approximately ⅔ to ¾ of the weight of the conventional thermoplastic bottles.

Another object of the invention is to provide filling and closing machinery for lightweight plastic bottles which will not distort or deform the bottle during the filling and capping operation.

Another object is to provide plastic bottles which are adapted to be filled and closed in the form in which they are molded and without performing any additional machining operations thereon.

Another object is to provide in a bottle filling and closing machine, a conveyor adapted to support the bottles entirely by the upper end thereof.

Another object is to provide a conveyor against which the filling heads and capping heads are adapted to clamp the upper end of a bottle and at least assist in supporting the bottle.

Another object is to provide a method for filling and heat sealing lightweight thermoplastic bottles as they are held in a suspended condition.

Another object is to provide a process for removably heat sealing a closure to the neck of a liquid-filled bottle.

These and other objects and advantages of the present invention will become more apparent from the following description when taken in conjunction with the drawings, in which:

FIG. 3 is an enlarged, fragmentary, top plan view of one of the bottle supporting clamps employed in the apparatus, shown in its open or bottle-receiving position;

FIG. 4 is a top plan view of one of the bottle support clamps in its closed position, the bottle being shown in phantom lines;

FIG. 5 is a fragmentary, vertical sectional view taken on the line 5—5 of FIG. 4;

FIG. 6 is an enlarged, transverse sectional view taken on the line 6—6 of FIG. 4;

FIG. 7 is an enlarged, fragmentary, vertical elevational view of one of the filling heads employed in the apparatus, with the cooperating bottle clamp and the bottle being shown in cross-section;

FIG. 8 is an enlarged, fragmentary, vertical sectional view of one of the sealing heads of the present invention; and FIG. 9 is a perspective view of one of the bottles or containers employed with the apparatus of the present invention.

Figure 1:
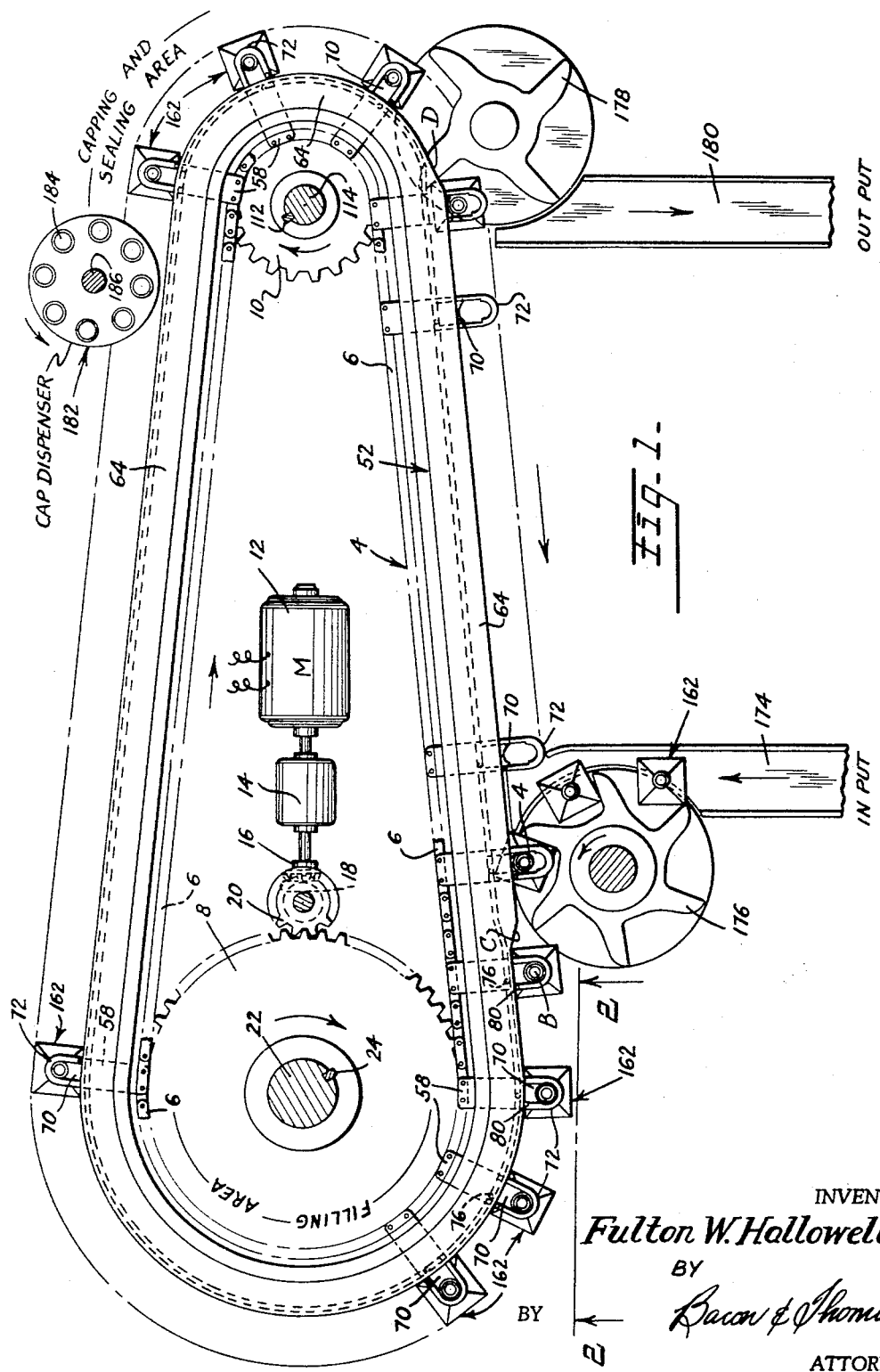
FIG. 1 is a partially diagrammatic, top plan view of an apparatus constructed in accordance with the principles of the present invention, with the filling, capping and sealing elements and associated mechanism being omitted for clarity.

The present bottle filling and closing machine includes a rotary filling area for filling lightweight thermoplastic bottles with milk or other liquid, a rotary cap dispensing area for depositing a heat-sealable cap on the top of each bottle as it passes and a rotary heat-sealing area for removably heat-sealing the cap to the bottle. As best illustrated in FIG. 1, a conveyor generally indicated by the numeral 4 includes an endless chain 6, which passes around a gear 8 integral with the rotary filling mechanism, and around a gear 10 which is integral with the sealing mechanism to rotate the filling and sealing mechanism and a cap dispensing mechanism in timed relation. A variable speed electric motor 12, connected to a suitable source of electricity, is employed to drive the gear 8 through suitable speed reduction gearing 14, bevel gears 16 and 18, and a spur gear 20. The gear 8 is attached to a vertical shaft 22 of the filling mechanism by means of a key 24, or any other suitable means, so that the gear 8 and the vertical shaft 22 rotate together.

A storage container 26 (FIG. 2), for the liquid to be dispensed into the bottles, is fixedly attached to the upper end of shaft 22 for rotation therewith. Also fixedly attached adjacent the upper end of vertical shaft 22, for rotation with the shaft, are a series circumferentially spaced, vertically movable filling heads generally indicated by the numeral 28. The storage container 26 is connected to each of the filling heads 28 by means of a flexible hose 30. An annular cam 32, disposed between the storage container 26 and the conveyor 4, is suitably mounted in fixed position and cooperates with the filling heads 28 to raise and lower the latter.

Figure 2:
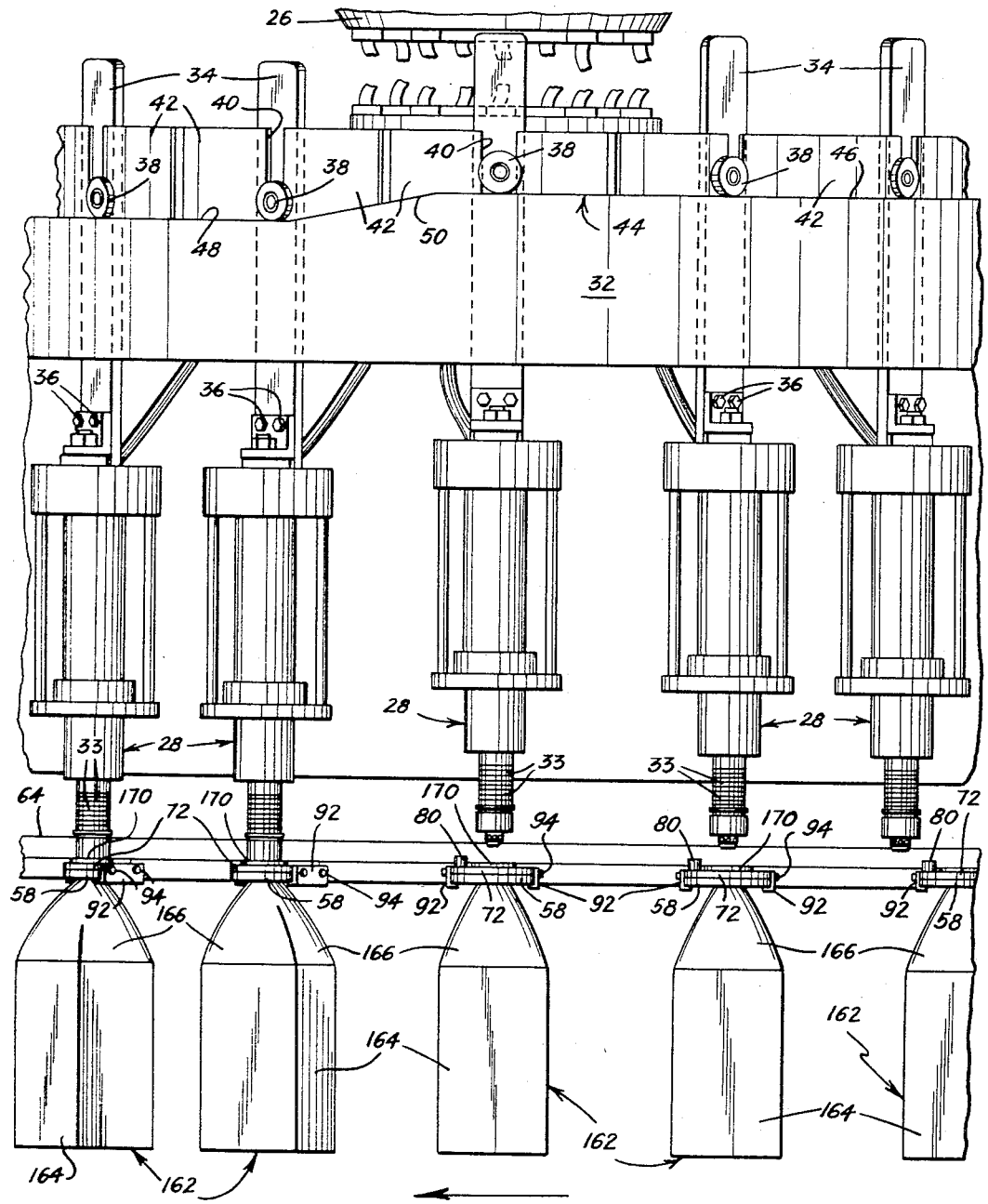
FIG. 2 is an enlarged, fragmentary, elevational view of a portion of the filling area as viewed substantially on the line 2—2 of FIG. 1.

The filling heads 28 employed in the present bottle filling machine may be of conventional construction and include controls for dispensing a predetermined volume of liquid into the bottles being filled. A series of removable spacers or shims 33, see FIGS. 2 and 7, are mounted on the lower portion of the filling heads 28 to provide for vertical adjustment thereof. A rigid metal strip 34, fastened at the lower end thereof to the upper end of each of the filling heads 28 by threaded bolts 36, is provided adjacent the upper end thereof with a laterally-extending roller 38. The rollers 38 are guided for vertical movement in vertically-extending slots 40 formed in the guide members 42 which are fixedly secured to the shaft 22 for rotation therewith.

The upper surface of the annular cam 32 is provided with a cam track 44 with which the rollers 38 cooperate to raise and lower the filling heads 28. The cam track includes an elevated portion 46 for maintaining the filling heads 28 out of contact with the bottles and a depressed portion 48 for permitting the filling heads 28 to maintain sealing contact with the bottles to be filled. The portions 46 and 48 of cam track 44 are connected by a pair of inclined portions 50, only one of which is shown, to permit gradual raising and lowering of the filling heads 28.

The chain 6 of the conveyor 4 is disposed adjacent the inner edge of a fixed annular frame 52, which includes upper and lower spaced apart annular sections 54 and 56, respectively. A series of equally spaced carrier plates 58 are positioned between frame sections 54 and 56 and in sliding engagement therewith. The inner end of carrier plates 58 extend laterally inwardly of the frame 52 and are secured to the chain 6 by the pins 60 which are employed to connect the links of the chain together. The outer end of carrier plates 58 extend laterally outwardly beyond the outer extremity of the frame 52 and are provided with a circular opening 62 adjacent the outer end thereof.

An annular cam supporting member 64 is secured to the upper surface of frame section 54 by threaded bolts 66 and extends outwardly beyond the outer edge of frame section 54. A short downwardly-extending cam track 68, formed at the outer end of the member 64, is spaced laterally outwardly from the outer edge of the frame section 54 and terminates in vertically-spaced relationship above the carrier plate 58. An inner and an outer cooperating gripping jaw 70 and 72 respectively, is slidably mounted on each of the carrier plates 58 with the inner end of each of the gripping jaws being disposed between the carrier plate 58 and the lower surface of the cam track 68 and in sliding engagement therewith.

The space between the outer edge of the frame section 54 and the cam track 68 provides a cam groove 74 in which is located a cam-engaging roller 76 fixedly mounted on the upper surface of each of the inner gripping jaws 70 adjacent the inner end thereof. The inner surface 77 of the cam track 68 provides a cam which is engaged by the rollers 76. The outer surface 78 of the cam track 68 forms a cam which is engaged by a cam-following roller 80 fixedly mounted on the upper surface of each of the outer gripping jaws 72 adjacent the inner end thereof. Each pair of gripping jaws 70 and 72 are normally urged toward the closed position shown in FIG. 4 by means of a tension spring 82. One end of tension spring 82 is connected to the inner gripping jaw 70 by a angle arm 84. The inner end of the arm 84 is rigidly connected to the jaw 70 by a threaded fastener 86. In order to position the angle arm 84 above the upper surface of the gripping jaw 72, a spacer sleeve 88, through which the screw fastener 86 passes, is positioned between the upper surface of the inner jaw 70 and the angle arm 84. The other end of the spring 82 is fastened to a stud 90 which is rigidly secured adjacent the outer end of the outer jaw 72. An angle iron 92 is secured to each side of each of the outer jaws 72 by threaded bolts 94 with the horizontally disposed leg 96 of each of the angle irons 92 extending beneath and in sliding engagement with the lower surface of the cooperating carrier plate 58. The outer jaws 72 are substantially U-shaped, as viewed in FIGS. 3 and 4, and embrace the opposite side of the inner gripping jaws 70 for sliding engagement therewith.

The outer end of each of the inner gripping jaws 70 is provided with a semicircular recess 98, while the opposed surface of the outer jaw is provided with a cooperating semicircular recess 100. The recesses 98 and 100 are tapered downwardly and radially inwardly as at 102 in order to conform to the upper neck portion of the bottle to be gripped, as clearly shown in FIGS. 7 and 8. The upper surface of each of the inner and outer jaws is provided with a generally V-shaped semicircular recess 104, concentric with and spaced a short distance radially outwardly from the tapered portion 102 of the semicircular recesses 98 and 100. When the gripping jaws 70 and 72 are moved to the closed position, as shown in FIGS. 4–8, the semicircular recesses 104 are connected end to end to form an annular recess which is concentric with the circular opening provided between the gripping jaws by cooperating recesses 98 and 100. At this time the outer end 106 of jaw 70 abuts against an opposing cooperating surface 108 on the outer jaw 72. The opening 62 in the carrier plates 58 is larger in diameter than the neck of the bottle to be gripped and is concentric with the circular opening provided between the closed gripping jaws.

Between a position C disposed adjacent the area where empty bottles are supplied to the filling mechanism and a position D disposed adjacent the area where filled and closed bottles are carried away from the apparatus, see FIGS. 1 and 3, the cam surfaces 77 and 78 spaced apart a distance sufficient to maintain the gripping jaws 70 and 72 in the open position. Throughout the remainder of the cam track 68, see FIGS. 1 and 3–5, the cam surfaces 77 and 78 are spaced apart a lesser distance to permit the gripping jaws 70 and 72 to move to the closed position to grip and support a bottle therebetween. At the positions C and D, the cam surfaces 77 and 78 are tapered to move the gripping jaws gradually between open and closed positions.

At the sealing area, the gear 10, which is driven by the chain 6, is fixedly secured by means of a key 112 to the vertically-disposed shaft 114 of the rotary heat sealing mechanism. A series of circumferentially spaced, electrically heated sealing heads 116, one of which is shown in FIG. 8, are mounted on shaft 114 for rotation therewith and for vertical movement relative thereto. A shaft 118, fixedly secured for vertical adjustment in an opening 120 formed in the upper end of the body 122 of the heat sealing head 116 by means of a threaded set screw 124, extends upwardly from the heat sealing head 116 and is slidably mounted in a bearing 126 which is fixedly connected by suitable means, not shown, to the shaft 114 for rotation therewith. A pair of rollers 128 and 130 are secured adjacent the upper end of shaft 118 and are spaced apart a distance sufficiently to engage the upper and lower surfaces of an annular cam track 132, which is fixedly secured by suitable means, not shown, to the frame 52. The cam track 132, as shown in FIG. 8, includes a depressed portion 134 for maintaining the heads 116 in a lower position in contact with the closure to be applied to a bottle, and an elevated portion 136 for maintaining the sealing heads in an upper position out of contact with the closure. The depressed portion 134 of the annular cam track is connected to the elevated portion 136 by a pair of inclined portions 138, only one of which is shown.

The lower surface of the heat sealing head 116 is formed with a downwardly opening annular recess 140 in which an annular electric heating element 142 is disposed for vertical sliding movement therein. The annular electric heating element 142 is maintained in the annular recess 140 against the downward force of a compression spring means 148, which is disposed between the upper surface of the heating element 142 and the bottom of the annular recess 140, by a stop washer 150 fastened to the lower surface 151 of the head 116 by the threaded screws 152. The washer 150 is slightly larger in diameter than the minor diameter of the heating element 142 and protrudes for a short distance beyond the boundary of surface 151 for abutting the annular shoulder 153 formed on the heating element 142.

The outer edge of the lower surface of the washer 150 is provided with a downwardly extending annular bead 158. The lower surface of the heating element 142 is formed with a narrow, depending, annular shirt 144, which is spaced from the inner and outer periphery of the heating element. The bottom of the shirt 144 extends for a short distance below the bottom of the bead 158 when the head is in the raised position and the shoulder 153 is in engagement with the washer 150. The lower edge of the outer, annular shell 146 of the head 116 extends downwardly for a short distance below the lowermost portion of the annular bead 158 and is beveled as at 160 in order to cooperate with the V-shaped, circular recess 104 when received therein as illustrated in FIG. 8. A slot 154 or other suitable opening is formed in the side wall of the shell 146 to permit the passage of electric wires 156 therethrough for furnishing the electric heating element 142 with current.

The bottles 162, which are to be filled and closed by the present filling and closing machine, are preferably formed of a lightweight thermoplastic material. The plastic bottles may be formed by conventional blow molding procedures and include an enlarged body portion 164 which may be of any desired configuration, but which is shown by way of example in the drawings as having a square cross-sectional configuration. The upper portion of the plastic bottles includes an upwardly and inwardly converging lower neck portion 166 with an upwardly and outwardly diverging upper neck portion 168. The upper neck portion 168, which is adapted to support a portion of the weight of the bottle, is preferably of inverted, frusto-conical configuration and tapered at the same angle as the taper 102 in the jaws 70 and 72. A flat, annular flange 170 is formed at the upper edge of the upper neck portion 168 and extends radially outwardly therefrom.

The heat-sealable closure 172, which is adapted to be removably heat-sealed to the upper surface of the annular flange 170, is slightly larger in diameter than the flange and the portion which extends outwardly beyond the edge of the annular flange 170 is adapted to be bent downwardly during the heat sealing operation by the beveled portion 160 of the annular shell 146. By forming the annular flange 170, with an outer diameter substantially the same as the inner diameter of the circular recess 104 when the jaws 70 and 72 are in closed position, only the outer edge portion of the closure 172 will be bent downwardly when the closure is pressed against the upper surface of the flange during the heat sealing operation.

The bottle filling and heat sealing machine disclosed herein and the conveyor structure employed to carry bottles through the machine are particularly adapted for employment with lightweight thermoplastic bottles of the type described herein. In order to reduce the amount of material used in forming the bottle, and thus to provide a lighter bottle more economical to manufacture, handle and ship, the walls of the bottle are formed to be only of sufficient thickness to support the bottle and a liquid contained therein without deformation or distortion but of sufficient thinness to be readily deformed and distorted by a relatively slight pressure applied to the upper ends of a bottom-supported bottle. For example, the average conventional one-gallon thermoplastic container when emptied, weighs approximately 115 to 125 grams, while the present lightweight thermoplastic bottle of one-gallon size weighs, when empty, approximately 50 to 80 grams. It will thus be seen that a saving of approximately 30 to 60% in material is realized by employing lightweight thermoplastic containers rather than the conventional containers. A similar saving is realized with containers of other sizes. Prior to the present invention, the apparatus necessary for properly supporting and handling lightweight plastic containers during the filling and closing thereof has not been available and therefore, lightweight containers of the type disclosed herein were not developed.

When filling and closing lightweight containers of the kind just described, it is desirable to avoid applying pressure to the opposite ends of the bottle during the filling and closing operations in order to avoid deformation and distortion of the bottle. The conveyor of the present invention, which supports the plastic bottles solely by the lower surface of annular flange 170 and by the upper neck portion 168, permits the bottles to be filled and sealed without pressure being applied to the lower end of the bottles and without deformation and distortion of the walls of the bottles.

In manufacturing bottles having a conventional neck and discharge opening, it is necessary to perform a machining operation on the neck of the bottle so that it will be of a predetermined size to receive a closure dimensioned for the bottle. The machining operation normally results in particles of the bottle and other foreign material being deposited in the bottle and consequently, these bottles must be washed in order to remove the undesirable material therefrom. This procedure is time consuming and adds to the expense of the bottle. The present bottle requires no machining and is ready for filling in the condition in which it is received from the blow-molding machine.

In operation, the empty bottles are supplied to the filling and closing machine by means of an input conveyor 174 and a conventional, rotary, star-wheel indexing mechanism 176, which operates in timed relationship with the endless conveyor 4. As a bottle is furnished to the conveyor 4 by means of the star wheel 176, it is first aligned with a pair of the gripping jaws which are in open position. The bottle is then raised into the open gripping jaws by any conventional means, such as an inclined conveyor or other suitable type of lifting mechanism (not shown). As the bottle is moved by the conveyor from the loading station A to the station B, the gripping jaws are moved from an open to a closed position due to the cam surfaces 77 and 78 converging at C and to the action of spring 82 to grip the upper neck portion 168 and with the annular flange 170 resting on the upper surface of the jaws 70 and 72. As the bottle progresses through the filling area, the appropriate filling head is lowered to clamp and seal the annular flange 170 between the filling head and the upper surface of the jaws 70 and 72 and the bottle is filled with a predetermined amount of liquid. The filling head is subsequently raised and the bottle is conveyed from the filling area past a conventional rotary cap dispensing device 182 where a heat sealable closure 172 from one of the stacks 184 is deposited in the proper position on the upper surface of the annular flange 170. The vertical shaft 186 of the cap dispenser is connected by suitable drive means, not shown, to the conveyor chain 6 for rotation in timed relation therewith. The bottle then moves into the sealing area where the appropriate heat sealing head 116 is moved downwardly by the cam track 132. The annular bead 158 clamps the closure 172 and the flange 170 against the jaws 70 and 72 while the beveled portion 160 of the shell 146 bends the outer edge of the closure downwardly. At the same time, the annular electric heating element 142 bears against the closure 172 and heats it sufficiently to removably bond the closure to the flange. As soon as the closure 172 is heat sealed to the annular flange 170, the heat sealing head 116 is raised by the inclined portion 138 of cam 132 and is maintained in raised position through a portion of the rotation of the sealing area by the elevated portion 136. The gripping jaws 70 and 72 are moved from closed to open position by the cam track 68 as it diverges at point D releasing the filled and sealed bottles from jaws 70 and 72. A conventional, rotary star-wheel indexing mechanism 178 moves the bottles 162 from the conveyor 4 onto the output conveyor 180, where they are carried away from the machine.

While a preferred form of the invention has been disclosed by way of example to illustrate this invention, such alterations, modifications and equivalents as may occur to those skilled in the art are to be considered within the purview of the invention as fall within the broad interpretation of the appended claims.

I claim:

1. A one piece, molded thermoplastic bottle for holding a liquid, comprising: an enlarged body portion of generally square cross-sectional configuration; an upwardly and inwardly converging annular, lower neck portion extending upwardly from said body portion; an upwardly and outwardly diverging upper neck portion extending upwardly from said lower neck portion; and a thin, flat annular flange extending laterally outwardly from the upper edge of said neck portion.

2. A lightweight thermoplastic bottle for holding a liquid, comprising: an enlarged body portion of generally square cross-sectional configuration; an upwardly and inwardly tapered lower neck portion; an upwardly and outwardly diverging upper neck portion of frusto-conical configuration extending upwardly from said lower neck portion; and a flat, circular flange extending radially outwardly from the upper edge of said upper neck portion.

3. A lightweight thermoplastic bottle according to claim 2 wherein a flat circular disc closure is heat sealed to the upper surface of said circular flange.

4. A lightweight thermoplastic bottle according to claim 3 wherein said disc closure is slightly larger in diameter than said circular flange.

5. A thermoplastic bottle for holding a liquid, comprising: an enlarged body portion of generally square cross-sectional configuration; an upwardly and inwardly converging, annular, lower neck portion; an upwardly and outwardly diverging upper neck portion extending upwardly from said lower neck portion; and a flat annular flange extending laterally outwardly from the upper edge of said upper neck portion, the walls of said bottle being only of sufficient thickness to support the bottle and a liquid contained therein without deformation and distortion thereof and being of sufficient thinness to be readily deformed and distorted by a relatively slight pressure applied to the opposite ends of the bottle.

6. A lightweight thermoplastic bottle adapted to be entirely supported by the upper end portion thereof while being conveyed through a rotary, automatic filling apparatus for filling the bottle with a liquid and while being conveyed through a rotary, automatic sealing head for heat-sealing a closure to the upper end of the bottle, comprising: an enlarged body portion of generally square cross-sectional configuration; an upwardly and inwardly converging, annular, lower neck portion; an upwardly and outwardly diverging upper neck portion extending upwardly from said lower neck portion; and a flat annular flange extending laterally outwardly from the upper edge of said upper neck portion, the weight of a bottle of one gallon capacity, when empty, being between 50 and 80 grams.

References Cited

UNITED STATES PATENTS

| | | | |
|---|---|---|---|
| 2,652,283 | 9/1953 | Roop | 215—1 |
| 3,055,540 | 9/1962 | Ringlen | 150—.5 |

WILLIAM T. DIXSON, Jr., *Primary Examiner.*